United States Patent [19]

Bacaner

[11] 3,911,125

[45] Oct. 7, 1975

[54] METHOD OF TREATING ANGINA PECTORIS, CORONARY INSUFFICIENCY, AND PREVENTING MYOCARDIAL INFARCTION

[76] Inventor: Marvin B. Bacaner, 4401 Fremont Ave. South, Minneapolis, Minn. 55409

[22] Filed: May 23, 1973

[21] Appl. No.: 363,012

[52] U.S. Cl. ................. 424/244; 424/326; 424/329
[51] Int. Cl.² ................. A61K 31/14; A61K 31/33; A61K 31/155
[58] Field of Search ..................... 424/244, 326, 329

[56] References Cited
OTHER PUBLICATIONS

Parratt — Chem. Abst., Vol. 68, (1968), page 28314h.

*Primary Examiner*—Stanley J. Friedman

[57] ABSTRACT

A method of treating angina pectoris (i.e., suppressing the incidence of angina and relieving the painful symptoms of anginal attacks, treating coronary insufficiency and suppressing the incidence of myocardial infarction in living beings by increasing coronary blood flow by blocking the sympathetic nervous system by administration of a post-ganglionic sympathetic blocking agent. Bretylium tosylate, bethanidine and guanethidine are among the drugs known to have post-ganglionic sympathetic blocking properties. The drug is preferably administered prophylactically in angina-prone patients in advance of an anginal episode but it may also be given to shorten the duration and relieve the pain of an anginal attack in progress. In patients with signs and symptoms of acute coronary insufficiency and acute myocardial infarction, the prompt induction of sympathetic blockade will prevent and/or minimize the death of heart muscle (myocardial infarction).

4 Claims, No Drawings

METHOD OF TREATING ANGINA PECTORIS, CORONARY INSUFFICIENCY, AND PREVENTING MYOCARDIAL INFARCTION

This invention relates to the treatment of angina pectoris in living beings by administration of known post-ganglionic sympathetic blocking agents for the purpose of preventing or reducing the incidence of angina pectoris, of relieving the painful symptoms and shortening the duration of angina attacks already in progress and of preventing or reducing the incidence of myocardial infarction. This is accomplished by increasing the coronary blood flow by blocking the sympathetic nervous system. In patients with signs and symptoms of acute coronary insufficiency and acute myocardial infarction, post-ganglionic sympathetic blockade will prevent or minimize the permanent change to heart muscle (myocardial infarction).

My prior U.S. Pat. No. 3,441,649 and U.S. Pat. No. 3,495,013 are directed to the treatment of cardiac arrhythmias with bretylium tosylate and bethanidine, respectively. The present invention is based upon an extension of the research program leading to those prior inventions.

Angina pectoris or anginal syndrome is a characteristic thoracic pain, usually substernal, precipitated chiefly by exercise, emotion, or a heavy meal, and resulting from a moderate inadequacy of the coronary circulation. The anginal syndrome is caused by a temporary inability of the coronary arteries to supply sufficient oxygenated blood to the heart muscle. Pain in the chest is the outstanding clinical manifestation, and is usually described as squeezing, crushing, or vise-like. The pain is believed to be due to a disparity or imbalance between the amount of work the heart has to do and the amount of blood flow or oxygen it is receiving.

Studies have shown that during an anginal episode there is a definite fall in coronary blood flow and the heart goes into transient heart failure. There is an increase in endiastolic left ventricular pressure and the cardiac output falls. When it's over, the heart failure or the physiological signs of heart failure then go away. So an anginal episode is really the small episode of heart failure and in a sense a prelude to a myocardial infarction or heart attack.

Myocardial infarction is damage to a portion of the heart muscle by myocardial deficiency of blood, in the past thought to be usually the result of coronary artery occlusion or thrombosis. Now, recent evidence has shown that heart attacks are not due to actual physical obstruction of the coronary arteries but that the physical obstruction or the thrombus actually is a consequence of the infarction. Thus you have the thrombus or the clot forming after the heart tissue already dies or during the process of dying. An anginal episode is a transient constriction of the coronary arteries and the actual myocardial infarction, which includes the death of tissue, is not transient but a prolonged constriction of the coronary arteries.

It is the purpose of my invention to prevent or relieve the constriction of the coronary arteries by blocking the sympathetic nervous system with a post-ganglionic sympathetic blocker, of which there are several. Among them are bretylium tosylate, an ortho bromo benzyl quaternary ammonium salt (Darenthin-Burroughs Wellcome and Co.); bethanidine, N-benzyl N', N''-dimethylguanidine (Burroughs Wellcome); and guanethidine, [2-(octahydro-1-azocinyl)ethyl] guanidine (Ciba). Studies have been carried out on patients with angina. The first step was to see if sympathetic blockade could improve or decrease the number of anginal episodes in a group of patients. In this instance, the study consisted of a group of patients with very severe angina — actually almost angina dicubudus, in other words, anginal cardiac pain occurring while the patient is at rest. These patients all had more than 10 anginal episodes a day and some of them had as many as 22 a day.

These patients were studied as follows: They were taken off all other medication — those that had previously been on many types of anti-anginal therapy. These patients were taken off all therapy for 10 days and a chart was kept by the patient himself on the number of episodes of pain that he had and a history of this exertions and what he did to relieve his pain — usually nitroglycerine. Some of the patients had angiostats, electronic devices for nerve stimulation, which block the sympathetic pathways transiently. The objective was to find drugs which effectively produced prolonged blockade of the sympathetic nervous system enervating the heart and to this end two drugs, bretylium and bethanidine, were tested. The results are shown in Tables I and II. During the control period of 10 days no antianginal therapy was administered. During the next 10 day period the patient was given from 800 to 3200 mg per day of bretylium or 800 to 1600 mg per day of bethanidine.

Table I

| Patient | Average number of anginal attacks/day over 10 days | | Maximum number of anginal attacks in any one day during 10 day periods | |
|---|---|---|---|---|
| | Control | Bretylium | Control | Bretylium |
| 1 | 8.5 | 1 | 22 | 3 |
| 2 | 6.2 | 1.4 | 14 | 2 |
| 3 | 4.8 | 0.6 | 10 | 2 |
| 4 | 5.5 | 1.8 | 12 | 3 |

Table II

| Patient | Average number of anginal attacks/day over 10 days | | Maximum number of anginal attacks in any one day during 10 day periods | |
|---|---|---|---|---|
| | Control | Bethanidine | Control | Bethanidine |
| 5 | 6 | 0 | 12 | 0 |
| 6 | 5.2 | 2 | 10 | 2 |
| 7 | 6.2 | 0.8 | 15 | 3 |

As shown, four patients were given bretylium in amount from 800 to 3200 mg a day and each of three patients were given bethanidine in amount from 800 to 1600 mg a day. The number of anginal attacks per day over a 10 day period with no anti-anginal therapy was the control. Thereafter they were put on bretylium or bethanidine for the next 10 day period. This represents a total of 20 days. The average number of attacks during each 10 day period and the maximum number of attacks in any 24 hour period during the 10 day period are shown. In each instance the average number of attacks and the maximum number of attacks per day were significantly reduced, the most notable being a reduction from an average of 8.5 per day, with a maximum of 22 in 1 day, to an average under medication of 1 per day, with a maximum of 3 in 1 day. This patient, while under medication at home carrying out his usual activities, including moderate walking, driving, attending church, shopping, etc., had 2 days with no pain, for the first time in 2 years.

Although not desiring to be bound by any particular theory, it is believed that angina is usually not a permanent disease but resolves itself in two ways. Collaterals are made by which new blood channels are opened up to the area which is not getting enough blood by the physiological process, and the pain is relieved for a while until the new channels are adequate, or the patients infarct and then they stop getting these pains because the tissue dies and the nerves die. What really is being done in treating angina according to the present invention is in a sense preventing a prolonged coronary constriction or spasmodic constriction that leads to a myocardial infarction, a coronary occlusion or heart attack, with consequent death of the tissue. In an angina attack the vessel stays closed for a short period of time and then through medication or because the stimulus for prolonged attack is not there, it relaxes and the tissue doesn't die. It is a transient episode of heart failure, but the tissue itself remains viable.

Distinction must be made between the vascular disease which is anatomical, i.e., arteriosclerotic disease which is anatomical, and the additional condition superimposed. The patient doesn't change his anatomical disease between anginal episodes. He gets his angina because something is added on the already existing vascular disease, and it is this which is sympathetically mediated and blocked by the herein described treatment.

A further study was made to compare treatment with bretylium with no treatment in order to determine the ability to prevent arrhythmias in patients who were admitted to a coronary care unit and suspected of having an acute myocardial infarction. On even numbered days patients were admitted to the non-bretylium or control series and on bretylium days they were admitted to the bretylium series and immediately upon their admission to the coronary care unit received 500 mg of bretylium which was repeated every 6 hours over 5 days to prevent arrhythmias. A total of 67 patients were initially included in the study. The results are summarized in Table III:

Table III

| Number of patients entering series with suspected Myocardial Infarction | Controls (no $R_x$) | Bretylium Prophylaxis (500 mg q 6 h × 5 days) |
|---|---|---|
| Without arrhythmias | 35 | 32 |
| Had infarct proven | 30 ⎫ (91.5%) | 19 ⎫ (59.4%) |
| Probable or possible infarct | 2 ⎭ | 0 ⎭ |
| No infarct | 3 (8.6%) | 13 (40.6%) |
| Developed arrhythmias requiring treatment | 9 (25.7%) | 8 (25%) |
| Patients excluded because they did not meet requirements of protocol | 11 | 13 |
| Deaths | 4 | 0 |
| Final number in series | 24 | 19 |

As shown, the bretylium treatment did not prevent arrhythmias. The two groups both got the same number of arrhythmias — 25.7 per cent and 25 per cent. However, the bretylium group got much less serious arrhythmias than the other group. Breakthrough arrhythmias in bretylium prophylaxis patients tended to be limited to PVC's which were usually suppressed by supplementary doses of bretylium. Of great significance was the fact that 91.5 per cent of patients in the control group admitted with presumptive infarct went ahead and developed infarct, whereas only 59 per cent of the bretylium prophylactic patients admitted with presumptive infarct went ahead and had infarct. 40.6 per cent did not. This is strong evidence that bretylium has prevented the evolution of the infarct. In other words, bretylium converted in infarct into an anginal episode, so that the true picture of infarction was blocked and this is an important adjunct to its anginal potential. Used as an anti-anginal agent, it will not only prevent the anginal attack but it will also prevent infarction. There is accumulating evidence that myocardial infarction develops as a consequence of prolonged reflex coronary vasoconstriction and the thrombus formation is secondary to the infarction rather than the reverse. This process may be interrupted by the early administration of bretylium and similar post-ganglionic sympathetic blocking agents, including bethanidine. The pain is relieved because the drug increases the coronary blood flow and the coronary blood flow is increased because the sympathetic vasoconstrictors are blocked.

Dosages range from about 1 to 50 mg per kg of body weight depending upon mode and frequency of administration. Dosage for intramuscular administration ranges from about 1 to 20 mg per kg of body weight. Angina-prone patients may be given prophylactic doses at time intervals ranging from every 4 to 8 hours up to once a day.

The compound of the present invention may be presented in pharmaceutical preparations prepared by any of the well-known methods of pharmacy.

For oral administration, fine powders or granules of the compound may contain diluents and dispersing and surface active agents, and may be presented in a draft in water or in a syrup, in capsules or cachets in the dry state or in a non-aqueous suspension, when a suspending agent may be included; in tablets, when binders and lubricants may be included; or in a suspension in water or a syrup or an oil, or in a water/oil emulsion, when flavoring, preserving, suspending, thickening and emulsifying agents may be included. The granules or the tablets may be coated.

For parenteral administration, the compound may be presented in aqueous injection solutions which may contain antioxidants, buffers, bacteriostats, agents which solubilize a relatively insoluble compound, and solutes which render the salts isotonic with the blood; in aqueous suspension when suspending agents and thickening agents may be included; or in non-aqueous solutions and suspensions. Extemporaneous injection solutions may be prepared from sterile pills, granules or tablets which may contain diluents, dispersing and surface active agents, binders and lubricants.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A method of treating angina pectoris and coronary insufficiency and aiding in preventing evolution of presumptive myocardial infarction in living human beings having such problems which comprises administering to said living human beings having such problems a small but effective amount of a post-ganglionic sympathetic blocking agent selected from the group consisting of bretylium tosylate, bethanidine and guanethidine sufficient to block the sympathetic nervous system and thereby relieving the interacting effect of prolonged spasmodic coronary constriction and increase in myocardial blood requirements which cause symptoms and ultimate death of myocardial tissue.

2. A method according to claim 1 further characterized in that said blocking agent is administered in amounts ranging from about 1 to 50 mg per kg of body weight.

3. A method according to claim 2 further characterized in that said blocking agent is administered in oral dosage from time intervals ranging from about every 4 to 8 hours to once a day.

4. A method according to claim 2 further characterized in that said blocking agent is administered in aqueous solution intramuscularly in amounts ranging from about 1 to 20 mg per kg of body weight at time intervals ranging from about every 4 to 8 hours to once a day.

* * * * *